United States Patent [19]

Yamazaki et al.

[11] Patent Number: 4,654,238
[45] Date of Patent: Mar. 31, 1987

[54] TRIM STRIP

[75] Inventors: Yoshio Yamazaki, Nishikasugai; Masahiro Takimoto, Inabe, both of Japan

[73] Assignee: Toyoda Gosei Co., Ltd., Nishikasugai, Japan

[21] Appl. No.: 788,871

[22] Filed: Oct. 18, 1985

[30] Foreign Application Priority Data

Oct. 18, 1984 [JP] Japan .................. 59-218896

[51] Int. Cl.$^4$ ............... B60R 13/02; B60R 13/04
[52] U.S. Cl. ................................ 428/31; 428/463
[58] Field of Search ................................. 428/31, 463

Primary Examiner—Alexander S. Thomas
Attorney, Agent, or Firm—Cushman, Darby & Cushman

[57] ABSTRACT

A trim strip is produced by extrusion coating a metallic insert with a vinyl chloride resin material through the medium of an acrylic resin type adhesive agent. The vinyl chloride resin material has the resin component thereof formed of 100 parts by weight of straight resin having an average polymerization degree, $\overline{P}$, in the range of 1,000 to 3,000 and 15 to 50 parts by weight of polymethyl methacrylate having an average molecular weight, $\overline{M}$, in the range of 1,000,000 to 4,000,000. The trim strip, therefore, produces high adhesive strength between the metallic insert and the vinyl chloride resin layer, enjoys satisfactory extrusibility, and entails substantially no formation of fisheyes in the coating of the produced trim strip.

7 Claims, 1 Drawing Figure

TRIM STRIP

BACKGROUND OF THE INVENTION

1. Field of the Invention

This invention relates to trim strips produced by causing metallic inserts to be extrusion coated with vinyl chloride resin, and more particularly to trim strips for use in external ornamentation of automobiles.

2. Description of the Prior Art

Generally, trim strips for external ornamentation of automobiles are required to withstand weather conditions and, because the automobiles are destined to have their shells washed with wax remover (steam containing kerosene) at the time of delivery, to resist kerosene. Most of the conventional trim strips, therefore, have been produced by causing inserts 2 such as of stainless steel to be extrusion coated with a vinyl chloride resin material (hereinafter referred to as "PVC material") capable of satisfying the requirement mentioned above (FIG. 1).

The trim strips constructed as described above, however, have posed the following problems:

(a) The adhesive property which the PVC material (particularly possessed of rigidity, Hs (Shore A), exceeding 98) exhibits to the metallic insert is not sufficient. It has been customary, therefore, to make up for the deficiency in the adhesive property by the use of a two-component polyurethane type, a PVC type, or an acrylic type adhesive agent. Despite the effort, it is not easy to produce ample adhesive strength (particularly shear strength).

(b) For the PVC material to acquire sufficient resistance to kerosene, it is required to contain its plasticizer only in a small proportion (generally not more than 30 PHR). Because of the insufficient plasticizer content, the PVC material exhibits no satisfactory extrusibility. The extruded resin coating, therefore, tends to contain therein fisheyes and fails to acquire a good outward appearance.

SUMMARY OF THE INVENTION

The trim strip of the present invention is produced by causing a metallic insert to be extrusion coated with a PVC material. The resin of the PVC material is composed of 100 parts by weight of straight resin having an average polymerization degree, $\overline{P}$, in the range of 1,000 to 3,000 and 15 to 50 parts by weight of polymethyl methacrylate (PMMA) having an average molecular weight, $\overline{M}$, in the range of 1,000,000 to 4,000,000. The metallic insert and the PVC material are joined to each other through the medium of an acrylic resin type adhesive agent.

Owing to the aforementioned construction, the trim strip of this invention acquires high adhesive strength (peel strength) between the insert and the PVC layer and, at the same time, enjoys satisfactory extrusibility, and entails substantially no formation of fisheyes.

The other objects and characteristics of this invention will become more apparent from the description given in further detail hereinbelow with reference to the accompanying drawing.

DESCRIPTION OF THE PREFERRED

Figure 1:
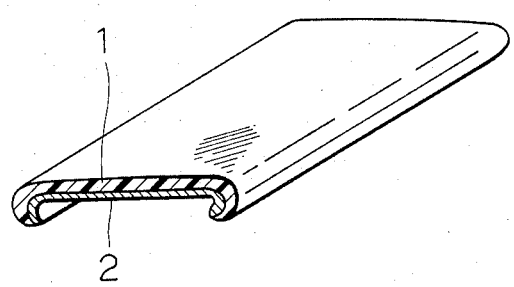
FIG. 1 is a partially cutaway perspective view illustrating a typical trim strip.

Now, the construction of the present invention will be described in detail below.

A. Basic composition of vinyl chloride resin:

(a) Straight resin—This is a homopolymer of vinyl chloride. Commercial products such as the product of Chisso Co., Ltd. marketed under trademark designation of "NIPOLIT" and the product of DenkiKagaku Co., Ltd. marketed under trade designation of "SS-110" can be cited as examples.

If the average polymerization degree, $\overline{P}$, of this straight resin is less than 1,000, the PVC material possesses an insufficient shape retaining property and the extruded resin tends to suffer from dispersion of profile size. If it exceeds 3,000, the PVC material exhibits deficiency in extrusibility and the extruded resin tends to suffer from poor outward appearance due to sharkskin.

(b) PMMA—Commercial products such as the product of Kanegafuchi Chemical Industry Co., Ltd. marketed under trademark designation of "KANEMIX" and the product of Sumitomo Chemical Co., Ltd. marketed under trademark designation of "SUMIPEX" can be cited as examples.

If the average molecular weight, $\overline{M}$, of PMMA is less than 1,000,000 or more than 4,000,000, the extruded resin tends to produce fisheyes due to PMMA.

If the amount of PMMA incorporated in the PVC material is less than 15 PHR, the extrusibility of the PVC material cannot be improved and the occurrence of fisheyes in the extruded resin cannot be sufficiently prevented and the adhesive property of the PVC material to the insert is not sufficient. If the amount of PMMA exceeds 50 PHR, uniform solution of PMMA in PVC is not easily obtained, the PVC material is deficient in mechanical strength, and the extruded resin tends to produce fisheyes therein.

(c) Other components—The PVC material may further incorporate therein a stabilizer, a plasticizer, and a filler. Concrete examples of the stabilizer are dibutyl tin dilaurate (DBTDL), dibutyl tin maleate, lead stearate, barium stearate, and tribasic lead maleate. Concrete examples of the plasticizer are dioctyl phthalate (DOP), diisooctyl phthalate, dibutyl phthalate, butylbenzyl phthalate, and didecyl phthalate. Concrete examples of the filler are calcium carbonate and clay. The amount of the plasticizer to be incorporated is not more than 30 PHR.

B. Acrylic resin type adhesive agent

This adhesive agent has as the resin component thereof at least one member selected from the group consisting of homopolymers and interpolymers of such acrylic esters as methyl methacrylate, ethyl acrylate, butyl acrylate, and 2-ethylhexyl acrylate, copolymers of the aforementioned homopolymers or interpolymers with acrylic acid, methacrylic acid, vinyl acetate, acrylonitrile, and ethylene, and the aforementioned homopolymers, interpolymers, and copolymers having their groups partially substituted.

C. Metallic insert—This insert is made of a metal selected from the group consisting of stainless steel, steel, and aluminum. The thickness of the metallic insert is generally in the range of 0.01 to 2 mm.

EXAMPLE

Trim strips of working examples and comparative experiments were obtained in the construction of FIG. 1, each having an insert (made of stainless steel) 2 extrusion coated with a PVC material 1 of the basic composition indicated below and containing PMMA in a varying amount. The extrusion was carried out at a rate of 4 m/minute and an extrusion head temperature of 180° C. The insert 1 was precoated with an acrylic type adhesive agent (product of Yokohama Rubber Co., Ltd. and marketed under trademark designation of "HAMA-TITE A-1104-B."

| Basic composition (in parts by weight) | |
| --- | --- |
| Straight resin (NIPOLIT, produced by Chisso) | 100 |
| Dioctyl phthalate | 10 |
| Dibutyl-tin-dilaurate | 2 |
| Calcium carbonate | 5 |
| PMMA ($\overline{M} = 2,000,000$) | Variable |

The trim strips of working examples and comparative experiments obtained as described above were tested for the varying items indicated below. The results are shown in Table 1. It is noted from the results that the trim strips of working examples invariably enjoyed satisfactory adhesive property and good outward appearance, whereas those of comparative experiments were deficient in adhesive property and/or outward appearance.

(1) Adhesive strength (peel test)

A given trip strip of working example (or comparative experiment) was cut into ten test pieces 50 cm in length. A square of 3 cm was cut at the center of each test piece in a depth reaching the surface of the metallic insert. A steel sphere 1 kg in weight was dropped on the cut square from a height of 1 m to inflict impact thereon. The test piece was then folded at an angle of 90°, with the cut square held outside, and then examined to determine whether or not there occurred any separation between the insert 1 and the PVC layer 2.

(2) Appearance test

A given trim strip extruded to a total length of 1 m was visually examined to determine whether or not the PVC layer contained any fisheye.

TABLE 1

| | Comparative Experiment 1 | Example 1 | Example 2 | Comparative Experiment 2 |
| --- | --- | --- | --- | --- |
| Amount of PMMA incorporated (parts by weight) | 0 | 20 | 40 | 60 |
| Adhesive strength*[1] (peel strength) | 10/10 | 0/10 | 0/10 | 0/10 |
| Outward appearance | 124/m | 0/m | 0/m | 38/m |

TABLE 1-continued

| | Comparative Experiment 1 | Example 1 | Example 2 | Comparative Experiment 2 |
| --- | --- | --- | --- | --- |
| (number of fisheyes) | | | | |

*[1]Number of test pieces involving separation/number of test pieces used in the test.

This invention is not limited to the working examples cited above but may be practised otherwise without departing from the spirit of the invention disclosed herein.

As described above, owing to the specific composition of the PVC material used for extrusion coating the metallic insert, the trim strip of this invention produces high adhesive strength between the metallic insert and the vinyl chloride resin layer, enjoys satisfactory extrusibility, and entails substantially no formation of fisheye in the coating of the produced trim strip.

What is claimed is:

1. A trim strip, comprising in combination (a) an insert made of a metal, (b) a vinyl chloride resin material having the resin component thereof formed of 100 parts by weight of straight resin having an average polymerization degree, $\overline{P}$, in the range of 1,000 to 3,000 and 15 to 50 parts by weight of polymethyl methacrylate having an average molecular weight, $\overline{M}$, in the range of 1,000,000 to 4,000,000 and used for extrusion coating said metallic insert, and (c) an acrylic resin adhesive agent through the medium of which said metallic insert is adhered to with said vinyl chloride resin material.

2. A trim strip according to claim 1, wherein said vinyl chloride resin material incorporates therein a stabilizer and a plasticizer.

3. A trim strip according to claim 2, wherein said stabilizer is one or more members selected from the group consisting of dibutyl tin dilaurate, dibutyl tin maleate, lead stearate, barium stearate, and tribasic lead maleate.

4. A trim strip according to claim 2, wherein said plasticizer is incorporated in an amount of not more than 30 PHR based on said straight resin.

5. A trim strip according to claim 2, wherein said plasticizer is one or more members selected from the group consisting of dioctyl phthalate, diisooctyl dibutyl phthalate, butylbenzyl phthalate, and didecyl phthalate.

6. A trim strip according to claim 1, wherein said metallic insert is made of stainless steel, steel, or aluminum.

7. A trim strip according to claim 1, wherein said acrylic resin adhesive agent has as the resin component thereof at least one member selected from the group consisting of homopolymers and interpolymers of such acrylic esters as methyl methacrylate, ethyl acrylate, butyl acrylate, and 2-ethylhexyl acrylate, copolymers of said homopolymers or interpolymers with acrylic acid, methacrylic acid, vinyl acetate, acrylonitrile, and ethylene.

* * * * *